(12) United States Patent
Cros et al.

(10) Patent No.: US 8,474,748 B2
(45) Date of Patent: Jul. 2, 2013

(54) AIRCRAFT UNDERCARRIAGE WITH MOTORIZATION AND TRANSMISSION

(75) Inventors: Christophe Cros, L'Union (FR); Debbie Leusink, Eguilles (FR)

(73) Assignees: Airbus, Blagnac (FR); Airbus Operations, Toulouse (FR)

( * ) Notice: Subject to any disclaimer, the term of this patent is extended or adjusted under 35 U.S.C. 154(b) by 319 days.

(21) Appl. No.: 12/637,516

(22) Filed: Dec. 14, 2009

(65) Prior Publication Data

US 2010/0147995 A1    Jun. 17, 2010

(30) Foreign Application Priority Data

Dec. 16, 2008    (FR) ...................................... 08 58646

(51) Int. Cl.
*B64C 25/50* (2006.01)
(52) U.S. Cl.
USPC .......................................... 244/50; 244/103 S
(58) Field of Classification Search
USPC .................. 244/50, 103 R, 103 S, 102 SS, 51
See application file for complete search history.

(56) References Cited

U.S. PATENT DOCUMENTS

| | | | | |
|---|---|---|---|---|
| 2,027,960 | A | * | 1/1936 | Crossley ........................ 244/101 |
| 2,287,491 | A | * | 6/1942 | Wolverton et al. ........ 244/103 S |
| 2,320,547 | A | * | 6/1943 | Tiger ........................... 244/103 S |
| 2,338,699 | A | * | 1/1944 | Wilhoit et al. ................... 244/79 |
| 2,347,986 | A | * | 5/1944 | Bowerman ................. 244/103 S |
| 2,376,621 | A | * | 5/1945 | Reed ........................... 244/103 S |
| 2,381,842 | A | * | 8/1945 | Schwend ................... 244/103 S |
| 2,417,937 | A | * | 3/1947 | Knox .......................... 244/103 S |
| 2,454,947 | A | * | 11/1948 | Schroeder ................. 244/103 S |
| 2,460,387 | A | | 2/1949 | Hunter |
| 2,507,440 | A | | 5/1950 | Hanson |
| 2,521,864 | A | | 9/1950 | Morse |
| 3,428,274 | A | * | 2/1969 | Ellis et al. ................. 244/103 R |
| 3,542,318 | A | * | 11/1970 | Ellsworth .................. 244/103 S |
| 3,711,043 | A | | 1/1973 | Cameron-Johnson |
| 3,762,670 | A | * | 10/1973 | Chillson ......................... 244/50 |
| 3,764,094 | A | | 10/1973 | Cross |
| 3,850,389 | A | * | 11/1974 | Dixon ........................ 244/103 S |
| 5,868,352 | A | * | 2/1999 | Tsukimori ..................... 244/50 |
| 6,131,852 | A | * | 10/2000 | Holloway ................. 244/102 R |

FOREIGN PATENT DOCUMENTS

| | | |
|---|---|---|
| DE | 735 458 | 5/1943 |
| FR | 2.065.734 | 8/2009 |

OTHER PUBLICATIONS

French Preliminary Search Report issued in French Patent Application No. 0858646 on Aug. 3, 2009 (w/ translation).

* cited by examiner

*Primary Examiner* — Philip J Bonzell
(74) *Attorney, Agent, or Firm* — Oliff & Berridge, PLC

(57) ABSTRACT

The aircraft includes an undercarriage having an upper portion, at least one wheel for running on the ground, and a shock absorber connecting the wheel to the upper portion. The aircraft also includes a motor for driving the wheel, the motor being rigidly fastened to the upper portion.

8 Claims, 3 Drawing Sheets

AIRCRAFT UNDERCARRIAGE WITH MOTORIZATION AND TRANSMISSION

FIELD OF THE INVENTION

The invention relates to aircraft, and in particular to their taxiing on the ground.

It is known to move airplanes by means of tractors to take them on the ground from a parking point situated close to an air terminal, to a point that is close to the runway for takeoff.

Nevertheless, the use of tractors leads to drawbacks. It increases ground traffic on an airport, thereby requiring airport staff to monitor traffic more closely in order to reduce any risk of collision. It also requires a set of operators and a fleet of tractors to be managed.

BACKGROUND OF THE INVENTION

In order to mitigate those drawbacks, proposals have been made to motorize airplane undercarriages so as to make them self-propelled for taxiing. Thus, document FR-2 065 734 describes, in the embodiment of its FIG. 2, an aircraft undercarriage including a motor positioned extending a hub of a wheel of the undercarriage, on the axis thereof. The motor serves to drive the wheel for self-propelled taxiing of the airplane on the ground, and thus without it being necessary to make use of a tractor.

Nevertheless, that arrangement generates numerous constraints concerning the choice of the type of motor and its dimensioning, or indeed concerning the undercarriage itself. There is not much space within the rim or the hub, nor even in the immediate environment of the wheels of the undercarriage. Furthermore, on landing there is an impact when the wheels make contact with the ground. In spite of the presence of tires, the impact is substantial and the motor must be designed to withstand such an impact, thereby giving rise to additional constraints in its design.

OBJECT AND SUMMARY OF THE INVENTION

An object of the invention is to make aircraft self-propelled for taxiing without generating too many constraints in the design of the undercarriage and its motorization.

To this end, the invention provides an aircraft that includes an undercarriage comprising an upper portion, at least one wheel for running on the ground, and a shock absorber connecting the wheel to the upper portion, the aircraft including a motor for driving the wheel, the motor being rigidly fastened to the upper portion.

Thus, by positioning the motor at a distance from the wheel, there is greater freedom in selecting the type of motor, its dimensions, and its power. Furthermore, since the shock absorber is interposed between the motor and the wheels, the motor is not subjected to the impact of landing and is therefore not located in an environment that is said to be "harsh". There is thus no need to overdimension the motor to enable it to withstand such an impact. In addition, there is great freedom in choosing the location of the motor.

Advantageously, the aircraft includes means for transmitting motion from the motor to the wheel, said means presenting at least one segment of length that is variable, e.g. of length that varies as a function of the length of the shock absorber.

Thus, the transmission of motion is conserved in spite of variations in the length of the undercarriage caused by movement of the shock absorber or indeed by the wheels coming into contact with the ground on landing, or losing such contact on takeoff. These variable-length means also make the invention compatible with an undercarriage that is retractable into an undercarriage well in the fuselage of the aircraft.

The aircraft may also include at least one of the following characteristics:

it includes a deformable member in a closed loop, such as a chain or a belt, for driving the wheel from the motor, and at least one tensioner for tensioning the member;

it includes a cardan-joint transmission for transmitting motion from the motor to the wheel; and it includes at least one friction roller and means for pressing the roller against the wheel or against an element secured to the wheel in order to cause it to rotate.

Provision may be made for the roller, or at least one of the rollers, to be constrained to rotate with a shaft and for it to be slidably mounted on the shaft.

Thus, the roller can remain in contact with the wheel in spite of the vertical movements of the wheel caused by the suspension.

As a replacement for the friction roller, it is possible to provide a toothed member, such as a disk, that meshes with a toothed wheel constrained to rotate with the running wheel. The toothed wheel may be installed for example on the rim or inside the rim.

Advantageously, the aircraft includes means for transmitting motion from the motor to the wheel, said means being arranged to be capable of taking up, at will, a position engaged with the wheel, in which they are suitable for transmitting motion to the wheel, and a position disengaged from the wheel, in which they are not suitable for transmitting motion to the wheel.

For example, the transmission means may comprise a cardan joint transmission interconnecting two shafts, and a moving ring suitable for covering the cardan joint so as to prevent any angular movement between the two shafts, under control.

Advantageously, the aircraft includes means for transmitting motion from the motor to the wheel, said means being situated at least in part behind a leg of the undercarriage and/or a hub of the undercarriage.

Thus, this arrangement reduces the noise liable to be generated by air coming into contact with the transmission means. In particular, it reduces aircraft noise during approach. It also reduces drag and the risk of the transmission means being exposed to impacts with objects or animals.

The motor is preferably of the electric or hydraulic type.

Provision may be made for the motor to be housed inside the fuselage or the wings of the aircraft.

Advantageously, the motor extends inside an undercarriage well of the aircraft, including when the undercarriage is deployed.

This provides more protection than would be available if it were exposed outside the fuselage or the wing.

Advantageously, the motor is fastened directly to the undercarriage.

It can then be positioned so as to form a part of a portion of the undercarriage that leaves the well, or on the contrary a portion of the undercarriage that does not leave the well.

The invention also provides an aircraft undercarriage that comprises:

an upper portion;

at least one wheel for running on the ground;

a shock absorber connecting the wheel to the upper portion; and a motor for driving the wheel, the motor being rigidly fastened to the upper portion.

BRIEF DESCRIPTION OF THE DRAWINGS

Other characteristics and advantages of the invention appear further from the following description of various embodiments given as non-limiting examples with reference to the accompanying drawings, in which.

MORE DETAILED DESCRIPTION

Figure 1:
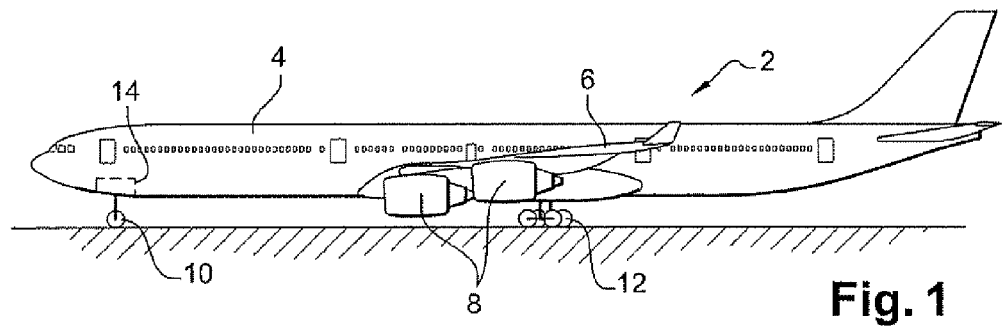
FIG. 1 is a side view of an aircraft of the invention while taxiing on the ground.
Figure 2:
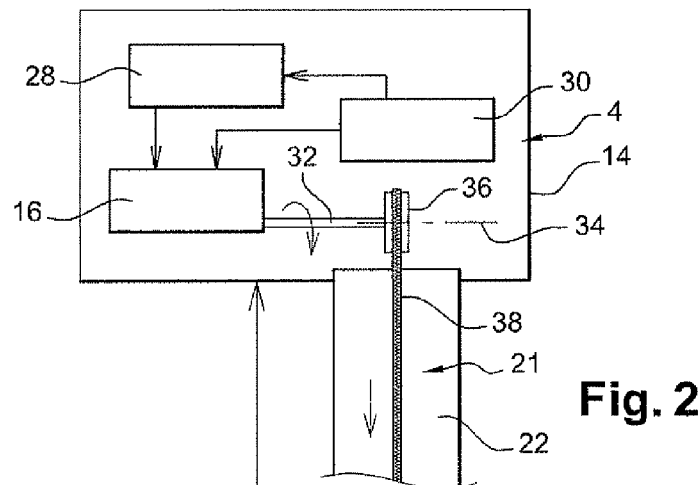
FIG. 2 is a fragmentary elevation view of an undercarriage of the FIG. 1 aircraft in a first embodiment.
Figure 3:
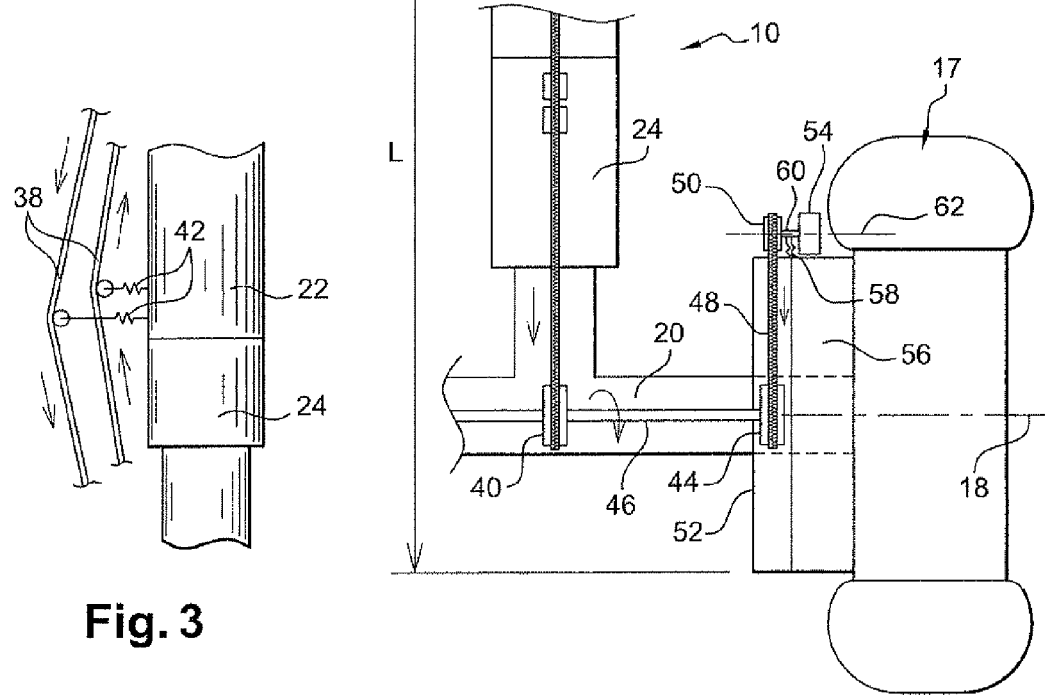
FIG. 3 is a side view of a portion of the FIG. 1 undercarriage.

There follows a description with reference to FIGS. 1 to 3 of a first embodiment of an aircraft of the invention. Specifically, the aircraft 2 is an airplane that takes off and lands by running along a runway. Nevertheless, the invention is equally applicable to other types of aircraft, in particular to vertical takeoff and landing aircraft.

The aircraft 2 comprises a fuselage 4, two wings 6, and four engines 8. Each wing carries one pair of engines 8. In the present example, the aircraft has a nose undercarriage 10 and three main undercarriages referenced 12. One of the main undercarriages extends vertically under a middle portion of the fuselage and the other two main undercarriages extend vertically under respective one of the wings. The fuselage 4 includes a compartment 14 forming a well for receiving the nose undercarriage 10, which undercarriage may present a retracted position in which it is received completely within the well 14, and a deployed position in which it extends in the vertical direction, when the aircraft is running on the ground.

The description below relates to the nose undercarriage 10, in the deployed position.

The undercarriage 10 in the present example has twin wheels 17. The two wheels 17 share a common main axis 18 and they are carried by a common hub 20 of axis 18 that extends horizontally.

The undercarriage 10 has a high portion 21 connecting it to the fuselage and comprising in particular a leg 22. The undercarriage 10 also includes a shock absorber 24 connecting the hub 20 to the leg 22. The shock absorber enables the hub to be mounted so as to be slidably movable relative to the leg 22 in the longitudinal direction of the leg. The weight of the airplane tends to shorten the length of the undercarriage in the vertical direction. The shock absorber 24 tends to lengthen said length.

The airplane 2 includes a motor 16 specifically received in the well 14 in the fuselage 4, and it is fastened rigidly and directly to the fuselage. In the present example, the motor is a hydraulic motor. The aircraft also has a hydraulic pump 28 likewise received in the well 14 together with a source of electricity 30 feeding the pump and the motor with electricity. The motor 16 has an outlet shaft 32 presenting a horizontal axis 34.

The elements of the mechanism for transmitting motion from the motor 32 to one of the wheels 17 are described below. The mechanism comprises a sprocket 36 rigidly mounted on the shaft 32, this sprocket meshing with a flexible deformable member 38 forming an endless closed loop, such as cog belt or a chain. The chain 38 extends in the vertical direction along the leg 22 parallel thereto and behind it so as to reach a sprocket 40 presenting a horizontal axis parallel to the axis 18 of the hub and of the wheel 17, and situated behind the hub. The chain 38 thus passes behind the leg 22, behind the shock absorber 24, and behind the hub 20. The mechanism includes one or more tensioners 42, there being two of them in this example. These tensioners are rigidly fastened to the undercarriage, e.g. to the shock absorber 24, and each of them bears against a respective one of the two vertical strands of the chain 38. They maintain substantially constant tension in the chain regardless of the position of the shock absorber 24 and regardless of the extended or retracted configuration of the undercarriage 10.

The mechanism includes a sprocket 44 that, like the sprocket 40, is rigidly fastened to a shaft 46. This sprocket meshes with a flexible deformable member 48 forming an endless closed loop, such as a cog belt or a chain, that also meshes with a top sprocket 50 mounted to rotate on a support 52 of the wheel 17. The sprocket 50 is constrained to rotate with a friction roller 54 having its peripheral outer rolling surface in contact specifically with a cylindrical part 56 rigidly secured to the wheel 17 and more precisely to its rim, and thus rotating therewith. The sprocket 50 and the roller 54 are rigidly constrained to rotate with a shaft 60 of horizontal axis 62 that is parallel to the axes 18 and 34. The mechanism also includes an actuator 58 fastened to the (non-rotating) support 52 and that keeps the roller 54 in contact with the casing by resilient return means. It thus ensures that the roller presses against the casing appropriately while enabling the roller to disengage from the casing, should that be necessary, on command of an operator. Given that the casing for the hydraulic pistons is an assembly that is robust, installing the sprocket 50 and the roller 54 does not present any problem in practice.

Like the chain 38 that is hidden behind the leg 22, the shaft 46 is hidden behind the hub 20, and the chain 48 is hidden behind the support 52, so as to reduce the noise that is likely to be created by air noise, and also the drag and any risk of exposure to objects. Nevertheless, in a variant, to further improve performance in this respect, provision may be made to hide the transmission mechanism in a fairing.

As can be seen, the mechanism as a whole is flexible. In particular, its length L (with only the vertical direction thereof being shown in FIG. 2) is variable so as to accommodate the differences in the length of the undercarriage associated with the shock absorber changing position and with the undercarriage being extended and retracted. Because the sprocket 40 is level with the hub 20 instead of being higher than the hub, it continues to be possible for the shock absorber 24 to move through considerable distances. The diameter ratios selected between the various sprockets and the diameter selected for the roller 54 enable the speed of the roller to be adapted to the characteristics of the motor 16.

In this first embodiment, motion is transmitted as follows. The outlet shaft 32 of the motor 16 rotates the sprocket 36 that acts via the chain 38 to rotate the sprocket 40. The shaft 46 turns the sprocket 44, thereby driving the chain 48 and the sprocket 50. The sprocket 50 rotates the roller 54 that, when in contact with the element 56, drives the wheel 17.

Figure 4:
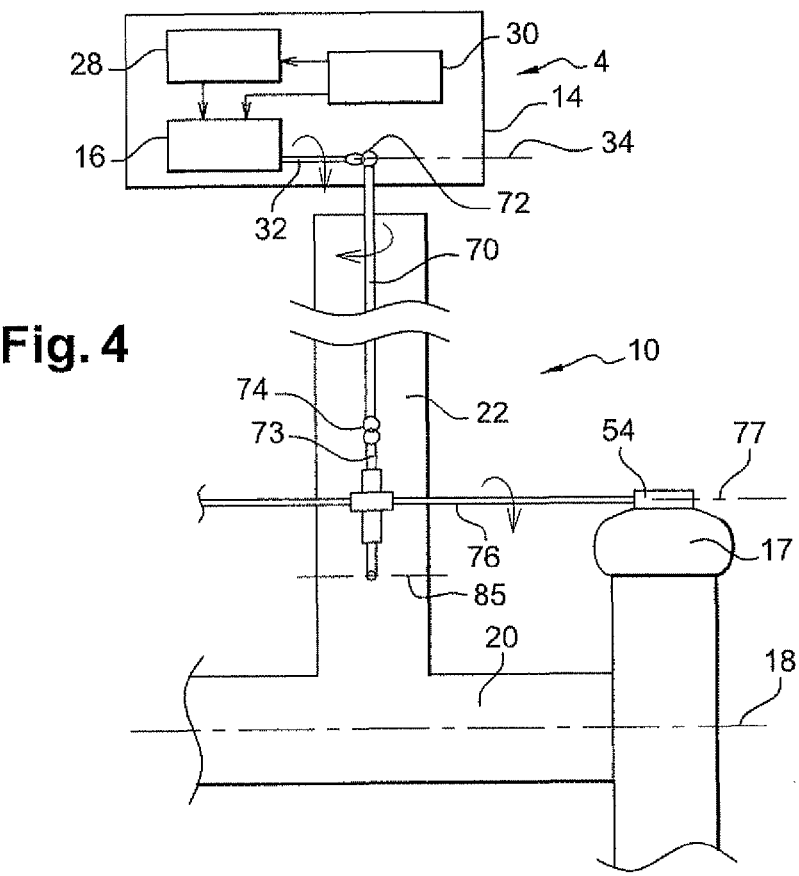
FIGS. 4 and 5 are views analogous to FIGS. 2 and 3 relating to a second embodiment.

A second embodiment of the invention is described below with reference to FIGS. 4 and 5.

Elements that are identical to those of the first embodiment are not described again. In particular, the shock absorber is not shown. In this embodiment, the mechanism for transmitting motion from the motor 16 to the wheel 17 comprises, instead of the chain 38, a shaft 70 extending vertically behind the leg 22 and parallel therewith. The shaft 70 is connected to the shaft 32 of the engine via one or more cardan joints 72.

The mechanism also includes an actuator 73, e.g. made in the form of a fluid-actuated jack. An upstream end of the actuator is connected to the shaft 70 by means of one or more cardan joints 74. The downstream end of the actuator 73 is connected to a rotary shaft 76 of horizontal axis 77 parallel to the axes 18 and 34, and having a downstream end, to the right in FIG. 4, that carries a friction roller 54. In this example, the roller is in friction engagement with the surface of the tread of the tire on the wheel 17, engaging the top of the wheel. The downstream end 75 of the actuator 73 is connected to one end of a link 80. Another end of the link is hinged to the leg 22 about an axis 81. The mechanism also includes a shock absorber 82 likewise made in the present example in the form of a fluid-actuated jack. One end of the shock absorber is hinged to a middle portion of the link 82 about an axis 83, while its other end is hinged to the leg 22 about an axis 85. The axes 32, 18, 77, 83, 81, and 85 are horizontal and mutually parallel.

Figure 5:
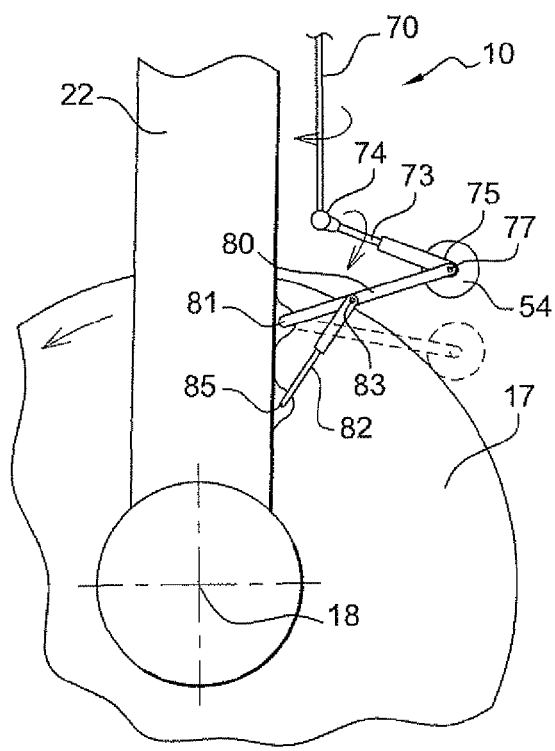

Controlling the actuator 73 thus enables the position of the roller 54 to be modified so as to be placed either at a distance such that it is disengaged from the wheel, as shown in continuous lines in FIG. 5, or in a position where it is in contact therewith, as shown in dashed lines in the same figure, where it makes contact with the wheel 17 so as to drive it by means of the motion produced by the motor 16. In co-operation with the shock absorber 82, the actuator 73 ensures that the roller 54 has good contact on the wheel 17.

It would also be possible, conversely, for the element 73 to act as a shock absorber while control is delivered by means of the element 82 acting as an actuator.

The means for transmitting motion between the shaft 70 and the shaft 76 are not shown in detail. By way of example they could be constituted by angle take-off gearing.

Once more, it can be seen that the shaft 70 is hidden behind the leg 22 so as to limit wind noise, drag, and the risk of exposure to objects.

In this second embodiment, motion is thus transmitted as follows. The outlet shaft 32 rotates the vertical shaft 70 via the cardan joint 72, and the motion is transmitted to the actuator 73 about its longitudinal axis by the cardan joint 74. The motion is then transmitted to the horizontal shaft 76 and to the roller 54 by the angle take-off gearing. The roller 54 is kept in contact with the wheel 17 by the actuator 73 and the shock absorber 82.

A third embodiment is shown in FIGS. 6 to 9. In this embodiment, the friction roller 54 is in contact, not with the surface of the tire tread, but with a lateral surface of the tire, e.g. on its inside 90, as shown to the left in FIG. 6. Under such circumstances, good contact can be guaranteed between the roller 54 and the tire by using a second roller or counter-roller 86 that is optionally active, and that bears on the side of the tire that is opposite from the side on which the roller 54 travels. In this example, the opposite side is the outside 92, on the right in FIG. 4.

Figure 6:
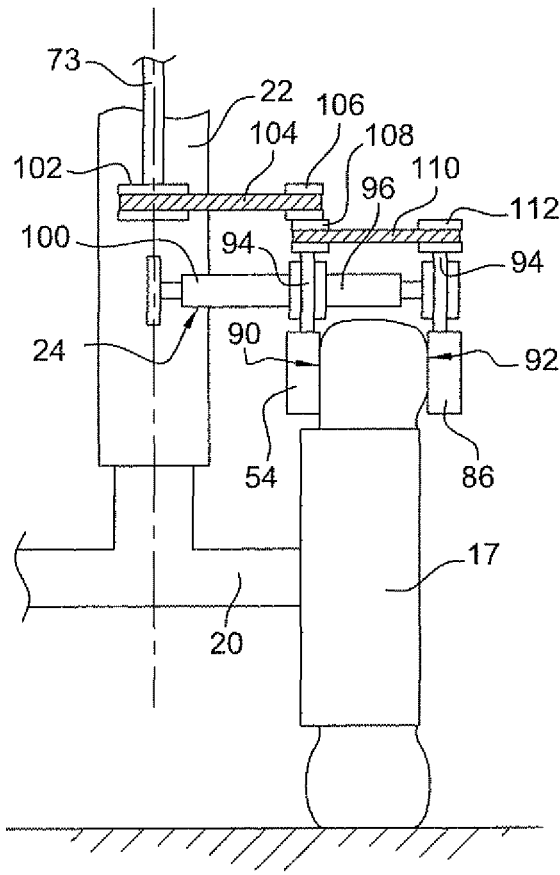
FIG. 6 is a view analogous to FIG. 2 showing a third embodiment.
Figure 7:
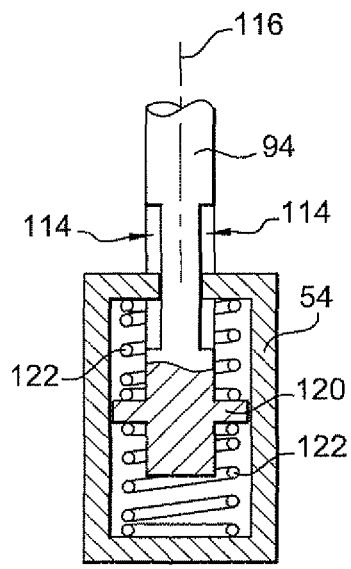
FIG. 7 is a fragmentary section view showing a detail of the FIG. 6 device.

The rollers 54 and 86 are thus in contact with opposite side walls of the tire. The rollers are carried by respective mutually parallel shafts 94 and they are constrained to rotate with their shafts. The shafts 94 are connected to each other by an actuator 96 that is pressure adjusted so that, at all times, the pressure exerted by the two rollers on the tire is constant and corresponds to the level needed to provide traction. This adjustment may be provided by mechanical or pneumatic means, or by appropriate electronic control. Thus, the spacing between the axes of the rollers is variable and adapts as a function of the pressure in the tire and also as a function of any deformation thereof while running on the ground. The actuator 96 is shown in FIG. 6 in the form of a jack comprising a cylinder and a piston mounted to slide in the cylinder, however the actuator could have some other form.

In the present example, the wheel drive means further comprise a support 100 connecting the actuator 96 to the leg 22 of the undercarriage. In the present example, this support is itself made up of at least two portions that are free to slide one within the other in order not to impede movement of the roller 54, as described above.

The two rollers may be driven for the purpose of driving the wheel 17 in various different ways. Pulleys and/or belts may be provided. Thus, FIG. 6 shows a pulley 102 rigidly mounted on the shaft 73 which acts via a horizontal belt 104 to rotate a pulley 106 mounted rigidly on the shaft 94 carrying the roller 54. Another pulley 108 is mounted on the same shaft and acts via a belt 110 to drive a pulley 112 that is rigidly secured to the top end of the shaft 94 carrying the counter-roller 86. The belt 110 is given a crossed configuration so that the roller and the counter-roller drive the wheel in the same direction.

Motion may also be transmitted from the motor to the wheel by means of an arrangement of sprockets and transmission chains or indeed by means of a set of links and cardan joints. Whatever the kind of transmission that is used, it is preferable for the transmission means to accommodate relative and absolute lateral movements of the rollers 54 and 86. Thus, there could also be provided a device serving to maintain tension in the belt or the chain should such an element be present. With a link, it would be possible once more to have a slider configuration as described with reference to FIG. 5. As described above with reference to the first and second embodiments, motion is delivered by a motor that is upstream from the shaft 73.

In the present example, the height of the wheel 17 relative to the leg 22 may vary in the presence of the suspension 24 while running on the ground and also when the wheel leaves the ground, or on the contrary when the wheel comes into contact with the ground. It is therefore appropriate to compensate these vertical movements of the wheel generated by the presence of the suspension. In the present example, this compensation is performed within the rollers 54 and 86. Thus, with reference to FIG. 7, there can be seen a fragmentary section of a roller of the same type as the rollers 54 and 86. The roller 54 is hollow and generally cylindrical in shape. It is closed by a disk at its bottom end and by a disk at its top end, the top disk presenting an orifice in its center, through which the shaft 94 passes. At this location, the roller 54 co-operates with the shaft 94 by complementary shapes so that the shaft can drive the roller in rotation. In the present example, and for this purpose, the shaft presents splines 114 that engage with fluting provided in the edge of the orifice in the top disk. This arrangement also allows the roller 54 to slide along the axis 116 of the shaft 94, relative thereto. The position of the roller 54 along the shaft 94 is thus variable. Inside the roller, the shaft carries a plate 120. Two springs 122 are provided along the axis 116 and extending respectively above and below the plate 120 inside the roller. These springs bear against the plate 120 and respectively against the top and bottom disks closing the roller. The two springs 122 are configured so as to hold the plate 120 halfway between the top and bottom disks when there is no stress on the roller. Because of the friction forces generated by the contact between the outside face of the roller and the side wall of the tire, each roller can follow the vertical movement of the wheel by sliding along the shaft 94 that carries it.

Such an arrangement may also be provided at locations in the system for transmitting motion other than at the wheel.

When the transmission means are not transmitting motion from the motor to the wheel, provision may be made for them not to engage with the wheel. For example, provision may be made for the roller 54 and the counter-roller 86 to be spaced apart from the wheel. In the present example, it is the support 100 that serves to move the roller 54 away, while the actuator 112 moves the counter-roller 86 away from the outside wall of the tire.

In another embodiment, provision may be made for the transmission means shown in FIG. 6 to be disposed behind the leg 22 when they are not in use. This change in position may be performed, for example, by pivoting about an axis corresponding to the axis of the shaft 73. This is also the axis about which the end of the support 100 is hinged to the leg 22. There is thus no dynamic incompatibility with performing this change of position.

Figure 8:
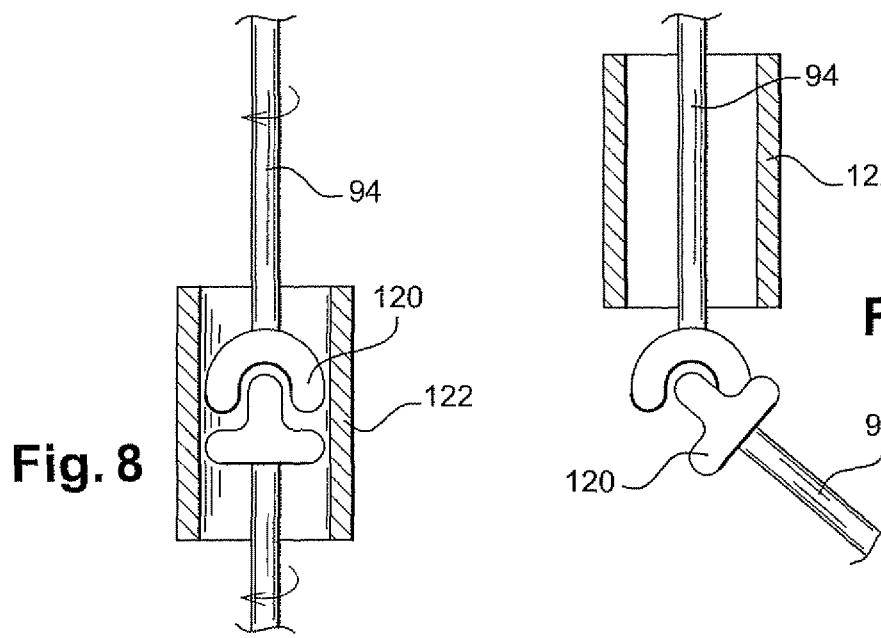
FIGS. 8 and 9 are detail views showing a variant embodiment of the FIG. 6 device in two operating configurations.
Figure 9:
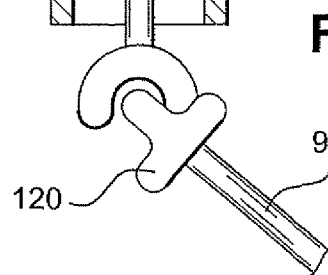

Nevertheless, it must be possible for the counter-roller 86 initially to be disengaged from the wheel so that the pivoting movement takes place without interfering with the tire. For this purpose, a cardan joint 120 may be provided on the shaft 94 carrying the counter-roller 86, the cardan joint being interposed longitudinally between two portions of the shaft. As shown in FIG. 9, such a cardan joint enables the top and bottom portions of the shaft 94 to move angularly relative to each other. By way of example, this movement may be performed under drive from a spring. In the present example, a ring 122 is slidably mounted on the shaft 94 and the cardan joint 120. When it is desired to use the transmission means for running purposes, it suffices to place the ring 122 on the cardan joint in the position shown in FIG. 8. This positioning prevents angular movement between the two portions of the shaft 94, against the force of the spring. These two portions are then in line with each other, as shown in FIG. 8. The cardan joints covered by the ring 122 is then in a blocked position. The shaft 94 can then transmit motion as though it were made as a single piece. The transmission means are then engaged with the wheel. Provision may also be made for the ring to be actuated by a dedicated device or by a mechanical system connected to the actuator 110. Thus, the longitudinal position of the ring on the shaft 94 is a function of the spaced-apart or not spaced-apart position of the actuator 110. For this purpose, it suffices to connect the ring to one of the portions of the actuator, for example. When the actuator is sufficiently spaced apart for the system to be in its inactive position and disengaged from the wheel, the ring 122 under drive from the spring releases the cardan joint by covering only one of the two portions of the shaft 94. The other portion is thus free to move angularly. This enables the counter-roller 86 to be folded vertically.

Such a foldable system presents numerous advantages. Thus, when running at high speed (takeoff or landing), there is no contact between the tire and the system, given that such contact at high speed would run the risk of damaging one or both of them. In addition, in the event of a tire bursting at high speed, any risk of the transmission means being damaged is reduced, and above all the risk of some part of these means being projected with high energy against the structure of the airplane is reduced. Such a possibility needs to be taken into account in the procedure for certifying the airplane. Finally, while in flight with the undercarriage extended (essentially during the approach), the noise associated with air flow around the device is greatly reduced by the device being masked to a large extent by the undercarriage.

The technology described above is simple to assemble and to implement. Given that the transmission mechanism is located outside the leg, it can easily be inspected at any time and it can be subjected to maintenance. The same applies to the motor 16, the pump 28, and the power supply 30. Positioning the motor 16 at a distance from the wheels 17 and their hub 20 also helps reduce the exposure of the motor to moisture and to high temperatures.

The invention is particularly suitable for independent taxiing of commercial airplanes.

Naturally, numerous modifications could be applied to the invention without going beyond the ambit thereof.

Thus, although the invention is described with reference to a nose undercarriage 10, it could also be implemented on one of the main undercarriages. Provision could also be made for two or more undercarriages to be motorized in accordance with the invention.

Mechanisms other than those described could be provided for transmitting motion from the motor to the wheel.

Above the motor 16 is described as being positioned in the underbelly of the airplane. Nevertheless, the motor could be placed at some other location within the fuselage or the wings. The motor may be fastened rigidly, directly or indirectly, to the high portion of the undercarriage.

Provision may be made for the motor to be fastened directly to the undercarriage.

Provision may be made for the hydraulic motor 16 to be replaced by an electric motor.

What is claimed is:

1. An aircraft with an undercarriage that includes an upper portion, the aircraft comprising:
   at least one wheel for running on the ground;
   a shock absorber connecting the wheel to the upper portion;
   a motor configured to drive the wheel to propel the aircraft during taxiing on the ground, the motor being rigidly fastened to the upper portion; and
   a horizontal chain or belt member in a closed loop for driving the wheel from the motor, and at least one tensioner for tensioning the chain or belt member.

2. An aircraft according to claim 1, wherein the motor is fastened directly to the undercarriage.

3. The aircraft according to claim 1, wherein
   the chain or belt member adapts to a varying length between the upper portion and the wheel.

4. An aircraft according to claim 3, wherein the varying length varies as a function of the length of the shock absorber.

5. An aircraft with an undercarriage that includes an upper portion, the aircraft comprising:
   at least one wheel for running on the ground;
   a shock absorber connecting the wheel to the upper portion;
   a motor configured to drive the wheel to propel the aircraft during taxiing on the ground, the motor being rigidly fastened to the upper portion; and
   a cardan joint for transmitting motion from the motor to the wheel, wherein the cardan joint interconnects two shafts so as to permit angular movement between the shafts, wherein the cardan joint includes a moving ring configured to selectively cover the cardan joint so as to lock the two shafts to ensure they remain substantially parallel to one another.

6. An aircraft according to claim 5, wherein the motor is fastened directly to the undercarriage.

7. The aircraft according to claim 5, wherein
   at least one of the shafts has a variable length to adapt to a varying length between the upper portion and the wheel.

8. An aircraft according to claim 7, wherein the varying length varies as a function of the length of the shock absorber.

* * * * *